(12) United States Patent
Numrich et al.

(10) Patent No.: US 8,088,847 B2
(45) Date of Patent: Jan. 3, 2012

(54) PMMA FILM FEATURING PARTICULARLY GREAT WEATHER RESISTANCE AND GREAT UV PROTECTION

(75) Inventors: Uwe Numrich, Gross-Zimmern (DE); Achim Neuhaeuser, Mainz (DE); Thorsten Goldacker, Rossdorf (DE); Thomas Arndt, Luetzelbach (DE); Alexander Laschitsch, Frankfurt (DE); Guenther Dickhaut-Bayer, Riedstadt (DE); Christoph Krohmer, Moetzingen (DE)

(73) Assignee: Evonik Roehm GmbH, Darmstadt (DE)

( * ) Notice: Subject to any disclaimer, the term of this patent is extended or adjusted under 35 U.S.C. 154(b) by 348 days.

(21) Appl. No.: 12/092,276

(22) PCT Filed: Dec. 22, 2006

(86) PCT No.: PCT/EP2006/070146
§ 371 (c)(1),
(2), (4) Date: May 1, 2008

(87) PCT Pub. No.: WO2007/074138
PCT Pub. Date: Jul. 5, 2007

(65) Prior Publication Data
US 2008/0281023 A1 Nov. 13, 2008

(30) Foreign Application Priority Data
Dec. 23, 2005 (DE) .......................... 10 2005 062 687

(51) Int. Cl.
*C08L 33/12* (2006.01)
*C08L 33/04* (2006.01)
*C08K 5/23* (2006.01)
*B32B 37/00* (2006.01)
*B05D 3/12* (2006.01)

(52) U.S. Cl. ............ 524/91; 524/560; 524/558; 156/60; 427/358

(58) Field of Classification Search .................... 524/91, 524/560, 558; 156/60; 427/358
See application file for complete search history.

(56) References Cited

U.S. PATENT DOCUMENTS

| | | | |
|---|---|---|---|
| 5,196,483 A * | 3/1993 | Zimmerman et al. ........ 525/310 |
| 5,530,080 A | 6/1996 | Siol et al. | |
| 5,612,417 A | 3/1997 | Rhein et al. | |
| 5,665,475 A * | 9/1997 | Sussner .................... 428/32.79 |
| 5,726,245 A | 3/1998 | Numrich et al. | |
| 6,214,942 B1 | 4/2001 | Siol et al. | |
| 6,254,712 B1 | 7/2001 | Enlow et al. | |
| 6,444,311 B1 * | 9/2002 | Friedman et al. ............. 428/354 |
| 7,456,239 B2 | 11/2008 | Theil et al. | |
| 2001/0050356 A1 | 12/2001 | Crano et al. | |
| 2003/0031847 A1 | 2/2003 | Numrich et al. | |
| 2004/0086721 A1 | 5/2004 | Bonnet et al. | |
| 2004/0127594 A1 * | 7/2004 | Yang et al. .................... 522/114 |
| 2005/0131114 A1 | 6/2005 | Sunahara et al. | |
| 2005/0164007 A1 | 7/2005 | Numrich et al. | |
| 2005/0267250 A1 * | 12/2005 | Theil et al. .................... 524/556 |
| 2006/0128848 A1 | 6/2006 | Lee et al. | |
| 2006/0235116 A1 | 10/2006 | Lazzari et al. | |
| 2007/0066708 A1 | 3/2007 | Goldacker et al. | |
| 2007/0123610 A1 | 5/2007 | Schultes et al. | |
| 2007/0185270 A1 | 8/2007 | Arndt et al. | |
| 2007/0197703 A1 | 8/2007 | Neuhauser et al. | |
| 2007/0222117 A1 | 9/2007 | Hoess et al. | |
| 2008/0132627 A1 | 6/2008 | Schultes et al. | |
| 2008/0138610 A1 | 6/2008 | Neuhauser et al. | |

FOREIGN PATENT DOCUMENTS

| | | |
|---|---|---|
| AU | 2005234631 A1 | 12/2005 |
| CA | 2225173 | 6/1996 |
| CN | 1678807 | 10/2005 |
| DE | 103 11 063 | 9/2004 |
| EP | 0 389 420 B1 | 9/1990 |
| EP | 0 528 196 A1 | 2/1993 |
| EP | 0 704 560 B1 | 4/1996 |
| EP | 0 889 085 A2 | 1/1999 |
| EP | 0 889 085 B1 | 1/1999 |
| EP | 1 382 640 A1 | 1/2004 |
| EP | 1 566 408 A1 | 8/2005 |
| JP | 2004-338222 A | 12/2004 |
| JP | 2005-97351 A | 4/2005 |
| RU | 2 083 605 C1 | 3/1990 |
| RU | 2 150 535 C1 | 9/1995 |
| RU | 2 230 758 C2 | 6/1998 |
| RU | 2 169 158 C2 | 9/1999 |
| WO | 97 00284 | 1/1997 |
| WO | 00 37551 | 6/2000 |
| WO | WO 00/33975 A2 | 6/2000 |
| WO | WO 00/33975 A3 | 6/2000 |
| WO | 2004 104081 | 12/2004 |
| WO | WO 2005/095478 | 10/2005 |
| WO | 2006 062315 | 6/2006 |

OTHER PUBLICATIONS

U.S. Appl. No. 12/865,242, filed Jul. 29, 2010, Goldacker, et al.
Office Action issued Feb. 21, 2011 in Russian Patent Application No. 2008129874/05(037019) (with German language translation).
U.S. Appl. No. 11/912,941, filed Oct. 29, 2007, Guenanten, et al.
U.S. Appl. No. 11/816,130, filed Oct. 9, 2007, Numrich, et al.
U.S. Appl. No. 10/570,194, filed Mar. 2, 2006, Numrich, et al.
U.S. Appl. No. 12/665,503, filed Dec. 18, 2009, Numrich, et al.
International Search Report issued on Jun. 25, 2008 in International Application No. PCT/EP2008/053147.

(Continued)

*Primary Examiner* — William Cheung
(74) *Attorney, Agent, or Firm* — Oblon, Spivak, McClelland, Maier & Neustadt, L.L.P.

(57) ABSTRACT

The invention relates to a novel UV-protective and weather-resistant package for surface protecting films for polyvinyl chloride window profiles made of poly(meth)acrylate. Matrix plastics having great molecular weights are used in order to obtain great weather resistance of the surface protecting films.

16 Claims, No Drawings

OTHER PUBLICATIONS

Taiwanese Office Action and Search Report issued on Mar. 22, 2011 in corresponding Taiwanese Application No. 095147968 filed on Dec. 22, 2006 (with an English Translation).

Chinese Office Action in Chinese Application No. 200680048017.8 dated Jun. 9, 2011. (w/English Translation).

"Light Stabilizers", Yang Ming, pp. 56-59 and 75, Handbook on Application of Plastic Additives, Jiangsu Science and Technology Press, Feb. 28, 2002.

* cited by examiner

PMMA FILM FEATURING PARTICULARLY GREAT WEATHER RESISTANCE AND GREAT UV PROTECTION

FIELD OF THE INVENTION

The invention relates to a single- or multilayer plastics molding, in particular composed of polymethyl (meth)acrylate (PMMA) or of a mixture of PMMA and polyvinylidene fluoride, with particularly high UV resistance and with high weathering resistance. This is used as, for example, surface-protection foils for polyvinyl chloride window profiles. The invention further relates to a package providing UV-protection and weathering-protection to transparent plastics, e.g. a PMMA foil, and the articles equipped with the surface-protection foil.

PRIOR ART

Polymethyl (meth)acrylate has very high weathering resistance and is therefore particularly suitable for any of the applications in outdoor areas subject to weathering. For this reason, PMMA foils have become established in the market for use as surface-protection foils for colored polyvinyl chloride (PVC) window profiles.

The finished profile must pass a test representing requirements of the RAL-Gütegemeinschaft, one of the provisions of the test being, inter alia, testing for weathering resistance. Long-term tests (Xenotest to ISO 4892-2) show that the weathering resistance of the standard products marketed by Röhm GmbH for this application sector, e.g. Plexiglas® 99845 colorless foil, meets current requirements, but that it can be further improved.

Furthermore, there is rising demand for surface-protection foils which markedly exceed the existing requirements for weathering resistance of the surface-protection foils. The foils obtainable hitherto in the market mostly use UV absorbers of benzotriazole type for stabilization with respect to UV radiation (wavelengths from 300 to 400 nm). These UV absorbers are marketed, by way of example, with the trade name Tinuvin P (2-(2'-hydroxy-5'-methylphenyl)benzo-triazole)) from Ciba Specialty Chemicals Inc. These UV absorbers are known to lose their activity to a significant extent over a period of 10 years. The weathering-protection foils modified therewith first become matt, and then microcracks form, followed by cracks. However, these UV absorbers also have advantageous properties: they are color-neutral (no yellowness index), involatile (important for extrusion of the foils) and inexpensive.

JP 2005-97351 (Mitsubishi Rayon) describes a foil composed of PMMA which has exceptional stability with respect to perfumes and compounds used in haircare and in hair cosmetics. The effect is achieved via the use of a mixture composed of UV absorbers whose melting point is not below 180° Celsius with a sterically hindered amine (HALS, hindered amine light stabilizer). Prime factors are the good ageing resistance of the foil when subject to thermal stress and its high solvent resistance. This foil is composed of a plurality of sublayers of different constitutions. The UV absorber can be either a benzotriazole or else a triazine. No advantages are described by the application with respect to weathering resistance.

JP-OS 2004-338222 describes an acrylate foil with increased fluorescence duration. To this end, a foil is used which has been modified with a specific UV absorber and another foil is arranged above the foil and has been modified with a fluorescent dye. Fluorescent dyes are known to have little resistance to UV radiation. UV absorbers that can be used are benzotriazoles, triazoles and benzophenones or combinations of these absorbers. No positive effects have been disclosed on the intrinsic stability of the PMMA or on non-fluorescent colors.

EP 1 022 311 A1 describes an acrylic film having increased elongation at break and improved hot-water whitening resistance while retaining solvent resistance. The increased elongation at break is intended to enable the film to be deformable without breaking, even at very low bending radii and/or high deformation rates. For this purpose a specific formulation is used which contains, inter alia, an acrylic-based thermoplastic component having a glass transition temperature of 65° C. or less and an average molecular weight of between 100 000 and 300 000. Indications of an improvement in weathering resistance cannot be found in said application.

Ciba company publications recommend combination of UV absorbers with HALS compounds for the stabilization of PMMA.

Object

An object was to develop a foil which is composed of PMMA and which, in terms of weathering resistance, is superior to the foil qualities hitherto available in the market, a particular intention being to improve stability over a prolonged period (>10 years). Stability means simultaneously the intrinsic resistance of the foil to UV effects and to weathering effects and the stability of the UV-protective action (which can be discerned by way of example from the stability of the color locus of a color layer covered with the protective foil).

Furthermore, the novel UV package is intended to have maximum color-neutrality.

The individual components are intended to cause minimum gas-evolution during processing in an extrusion plant.

The overall price of the UV package is not to be excessively high.

Migration of one or more components of the UV package to the surface of the foil is intended to be possible.

The intention is to cover the wavelength spectrum of maximum width (from 300 nm to 400 nm).

No clouding of the foil is intended to occur on exposure to moisture.

The foil is intended to be free from stress-whitening.

The intention is to use components which permit cost-effective operation of an extrusion plant.

The foil is intended to have excellent weathering resistance.

Achievement of Object

The object is achieved via the plastics molding according to claim 1, their use according to claims 9 and 11, and the stabilizer combination according to claim 16. The associated subclaims protect further advantageous embodiments. Furthermore, the molding can consist of a mixture of PMMA and fluorine-containing plastics, e.g. polyvinylidene fluoride (PVDF).

Working of the Invention

Preparation of the PMMA Plastics

Polymethyl (meth)acrylate plastics are generally obtained via free-radical polymerization of mixtures which comprise methyl methacrylate. These mixtures generally comprise at least 40% by weight, preferably at least 60% by weight and particularly preferably at least 80% by weight, based on the weight of the monomers, of methyl methacrylate.

These mixtures for production of polymethyl methacrylates can also comprise other (meth)acrylates copolymerizable with methyl methacrylate. The expression (meth)acrylates comprises methacrylates and acrylates and mixtures of the two. These monomers are well known. Among them are, inter alia, (meth)acrylates which derive from saturated alcohols, e.g. methyl acrylate, ethyl (meth)acrylate, propyl (meth)acrylate, n-butyl (meth)acrylate, tert-butyl (meth)acrylate, isobutyl (meth)acrylate, pentyl (meth)acrylate and 2-ethylhexyl (meth)acrylate; and also (meth)acrylates which derive from unsaturated alcohols, e.g. oleyl (meth)acrylate, 2-propynyl (meth)acrylate, allyl (meth)acrylate, vinyl (meth)acrylate; and also aryl (meth)acrylates, such as benzyl (meth)acrylate or phenyl (meth)acrylate, and in each case the aryl radicals here can be unsubstituted or can have up to four substituents; Cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; Glycol di(meth)acrylates, such as 1,4-butanediol (meth)acrylate, (meth)acrylates of ether alcohols, e.g. tetrahydrofurfuryl (meth)acrylate, vinyloxyethoxyethyl (meth)acrylate; amides and nitriles of (meth)acrylic acid, e.g. N-(3-dimethylaminopropyl)(meth)acrylamide, N-(diethylphosphono)(meth) acrylamide, 1-methacryloyl-amido-2-methyl-2-propanol; sulfur-containing meth-acrylates, such as ethylsulfinylethyl (meth)acrylate, 4-thiocyanatobutyl (meth)acrylate, ethylsulfonylethyl (meth)acrylate, thiocyanatomethyl (meth)acrylate, methylsulfinylmethyl (meth)acrylate, bis((meth)-acryloyloxyethyl) sulfide; polyfunctional (meth)-acrylates, such as trimethyloylpropane tri(meth)-acrylate.

Free-Radical Initiators

The polymerization reaction is generally initiated by known free-radical initiators. Among the preferred initiators are, inter alia, the azo initiators well known to persons skilled in the art, e.g. AIBN and 1,1-azobiscyclohexanecarbonitrile, and peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another and mixtures of the abovementioned compounds with compounds that have not been mentioned but which can likewise form free radicals.

Other Monomers

The compositions to be polymerized can comprise not only the (meth)acrylates described above but also other unsaturated monomers which are copolymerizable with methyl methacrylate and with the abovementioned (meth)acrylates. Among these are, inter alia, 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinyl-pyrrolidone, 2-vinylpyrrolidone, N-vinylpyrrolidine, 3-vinylpyrrolidine, N-vinylcaprolactam, N-vinyl-butyrolactam, vinyloxolane, vinylfuran, vinylthiophene, vinylthiolane, vinylthiazoles and hydrogenated vinylthiazoles, vinyloxazoles and hydrogenated vinyloxazoles; vinyl ethers and isoprenyl ethers; maleic acid derivatives, such as maleic anhydride, methylmaleic anhydride, maleimide, methylmaleimide; and dienes, such as divinylbenzene.

The amount generally used of these comonomers is from 0% by weight to 60% by weight, preferably from 0% by weight to 40% by weight and particularly preferably from 0% by weight to 20% by weight, based on the weight of the monomers, and the compounds here can be used individually or in the form of a mixture.

Regulator

The chain lengths of the polymers can be adjusted by polymerization of the monomer mixture in the presence of molecular-weight regulators, particular examples being the mercaptans known for this purpose, e.g. n-butyl mercaptan, n-dodecyl mercaptan, 2-mercaptoethanol or 2-ethylhexyl thioglycolate, or pentaerythritol tetrathioglycolate; the amounts generally used of the molecular-weight regulators being from 0.05 to 5% by weight, based on the monomer mixture, preference being given to amounts of from 0.1 to 2% by weight and particular preference being given to amounts of from 0.2 to 1% by weight, based on the monomer mixture (cf. by way of example H. Rauch-Puntigam, Th. Völker, "Acryl- und Methacrylverbindungen" ["Acrylic and Methacrylic Compounds"], Springer, Heidelberg, 1967; Houben-Weyl, Methoden der organischen Chemie [Methods of Organic Chemistry], Vol. XIV/1, page 66, Georg Thieme, Heidelberg, 1961, or Kirk-Othmer, Encyclopedia of Chemical Technology, Vol. 1, pages 296 et seq., J. Wiley, New York, 1978).

Impact-Modified poly(meth)acrylate Plastic

The impact-modified poly(meth)acrylate plastic is composed of from 20% by weight to 80% by weight, preferably from 30% by weight to 70% by weight, of a poly(meth)acrylate matrix and from 80% by weight to 20% by weight, preferably from 70% by weight to 30% by weight, of elastomer particles whose average particle diameter is from 10 to 150 nm (measurements, for example, by the ultracentrifuge method).

The elastomer particles distributed in the poly(meth)acrylate matrix preferably have a core with a soft elastomer phase and a hard phase bonded thereto.

The impact-modified poly(meth)acrylate plastic (imPMMA) is composed of a matrix polymer content, polymerized from at least 80% by weight of methyl methacrylate units and also, if appropriate, from 0% by weight to 20% by weight of units of monomers copolymerizable with methyl methacrylate, and of impact-modifier content distributed in the matrix and based on crosslinked poly(meth)acrylates.

The matrix polymer is in particular composed of from 80% by weight to 100% by weight, preferably from 90% by weight to 99.5% by weight, of free-radical-polymerized methyl methacrylate units and, if appropriate, from 0% by weight to 20% by weight, preferably from 0.5% by weight to 12% by weight, of other comonomers capable of free-radical polymerization, e.g. $C_1$-$C_4$-alkyl (meth)acrylates, in particular methyl acrylate, ethyl acrylate or butyl acrylate. The higher the molecular weight of the matrix polymers, the better the weathering resistance of the UV-protective foil.

The average molar mass $M_w$ (weight-average) of the matrix lies in the range from 80 000 g/mol to 200 000 g/mol, in particular at from 100 000 g/mol to 180 000 g/mol (determination of $M_w$ by means of gel permeation chromatography with reference to polymethyl methacrylate as calibration standard). Particularly good weathering stabilities are achieved by foils whose matrix polymer has an average molar mass $M_W$ (weight-average) of from 108 000 g/mol to 180 000 g/mol. The molar mass $M_W$ can be determined, for example, by gel permeation chromatography or a scattered-light method (see, for example, B. H. F. Mark et al., Encyclopedia of Polymer Science and Engineering, 2nd Edition, Vol. 10, pp. 1 et seq., J. Wiley, 1989).

Preference is given to a copolymer composed of from 85% by weight to 99.5% by weight of methyl methacrylate and from 0.5% by weight to 15% by weight of $C_1$- to $C_4$-alkyl (meth)acrylates, or a copolymer composed of from 90% by weight to 99.5% by weight of methyl methacrylate and from 0.5% by weight to 10% by weight of methyl acrylate. The Vicat softening points VSP (ISO 306-B50) can lie in the range of at least 90° C., preferably from 95° C. to 112° C.

The impact modifier and the matrix polymer can be mixed in the melt in an extruder to give impact-modified polymethacrylate molding compositions. The material discharged is generally first chopped to give pellets. These can be further processed by means of extrusion or injection molding to give moldings, such as sheets, foils or injection-molded parts.

The Impact Modifier

The polymethacrylate matrix comprises an impact modifier which by way of example can be an impact modifier having a two- or three-shell structure, preference being given to use of two-shell impact modifiers.

Impact modifiers for polymethacrylate plastics are well known. EP-A 0 113 924, EP-A 0 522 351, EP-A-0 465 049 and EP-A 0 683 028 describe by way of example the preparation and structure of impact-modified polymethacrylate molding compositions.

From 1% by weight to 35% by weight, preferably from 2% by weight to 20% by weight, particularly preferably from 3% by weight to 15% by weight, in particular from 5% by weight to 12% by weight, of an impact modifier which is an elastomer phase composed of crosslinked polymer particles is present in the polymethacrylate matrix.

In a further embodiment, from 1% by weight to 50% by weight, preferably from 2% by weight to 40% by weight, particularly preferably from 3% by weight to 35% by weight, in particular from 5% by weight to 30% by weight, of an impact modifier which is an elastomer phase composed of crosslinked polymer particles can also be present in the polymethacrylate matrix. The impact modifier is obtained in a manner known per se via bead polymerization or via emulsion polymerization.

In the simplest case materials involved are crosslinked particles obtained by means of bead polymerization whose average particle size is in the range from 10 nm to 150 nm, preferably from 20 nm to 100 nm, in particular from 30 nm to 90 nm. These are generally composed of at least 40% by weight, preferably from 50% by weight to 70% by weight, of methyl methacrylate, from 20% by weight to 40% by weight, preferably from 25% by weight to 35% by weight, of butyl acrylate, and from 0.1% by weight to 2% by weight, preferably from 0.5% by weight to 1% by weight, of a crosslinking monomer, e.g. a polyfunctional (meth)acrylate, e.g. allyl methacrylate and, if appropriate, other monomers, e.g. from 0% by weight to 10% by weight, preferably from 0.5% by weight to 5% by weight, of $C_1$-$C_4$-alkyl methacrylates, such as ethyl acrylate or butyl methacrylate, preferably methyl acrylate, or other vinylically polymerizable monomers, e.g. styrene.

Preferred impact modifiers are polymer particles which can have a two- or three-layer core-shell structure and are obtained via emulsion polymerization (see, for example, EP-A 0 113 924, EP-A 0 522 351, EP-A 0 465 049 and EP-A 0 683 028). However, the invention requires suitable particle sizes of these emulsion polymers in the range from 10 nm to 150 nm, preferably from 20 nm to 120 nm, particularly preferably from 50 nm to 100 nm.

A three-layer or three-phase structure with a core and two shells can be created as follows. The innermost (hard) shell can, for example, be composed in essence of methyl methacrylate, of small proportions of comonomers, e.g. ethyl acrylate, and of a proportion of crosslinking agent, e.g. allyl methacrylate. The middle (soft) shell can, for example, be composed of butyl acrylate and, if appropriate, styrene, while the outermost (hard) shell is in essence the same as the matrix polymer, thus bringing about compatibility and good linkage to the matrix. The proportion of polybutyl acrylate in the impact modifier is decisive for the impact-modifying action and is preferably in the range from 20% by weight to 40% by weight, particularly preferably in the range from 25% by weight to 35% by weight.

Two-Phase Impact Modifier According to EP 0 528 196 A1

Preference is given, in particular for foil production, but not restricted thereto, to use of a system known in principle from EP 0 528 196 A1 which is two-phase impact-modified polymer composed of:

a1) from 10% by weight to 95% by weight of a coherent hard phase whose glass transition temperature $T_{mg}$ is above 70° C., composed of
  a11) from 80% by weight to 100% by weight (based on a1) of methyl methacrylate and
  a12) from 0% by weight to 20% by weight of one or more other ethylenically unsaturated monomers capable of free-radical polymerization, and
a2) from 90% by weight to 5% by weight of a tough phase whose glass transition temperature $T_{mg}$ is below −10° C., distributed in the hard phase and composed of
  a21) from 50% by weight to 99.5% by weight of a $C_1$-$C_{10}$-alkyl acrylate (based on a2)
  a22) from 0.5% by weight to 5% by weight of a crosslinking monomer having two or more ethylenically unsaturated radicals which are capable of free-radical polymerization, and
  a23) if appropriate other ethylenically unsaturated monomers capable of free-radical polymerization,
where at least 15% by weight of the hard phase a1) has covalent linkage to the tough phase a2).

The two-phase impact modifier can be produced via a two-stage emulsion polymerization reaction in water, as described by way of example in DE-A 38 42 796. In the first stage, the tough phase a2) is produced and is composed of at least 50% by weight, preferably more than 80% by weight, of lower alkyl acrylates, thus giving a glass transition temperature $T_{mg}$ below −10° C. for this phase. Crosslinking monomers a22) used comprise (meth)acrylates of diols, e.g. ethylene glycol dimethacrylate or 1,4-butanediol dimethacrylate, aromatic compounds having two vinyl or allyl groups, e.g. divinylbenzene, or other crosslinking agents having two ethylenically unsaturated radicals which are capable of free-radical polymerization, e.g. allyl methacrylate, as graft-linking agent. Crosslinking agents that may be mentioned by way of example and have three or more unsaturated groups which are capable of free-radical polymerization, e.g. allyl groups or (meth)acrylic groups, are triallyl cyanurate, trimethylolpropane triacrylate and trimethylolpropane trimethacrylate, and pentaerythrityl tetraacrylate and pentaerythrityl tetramethacrylate. U.S. Pat. No. 4,513,118 gives other examples in this connection.

The ethylenically unsaturated monomers capable of free-radical polymerization and mentioned under a23) can, by way of example, be acrylic or methacrylic acid or else their alkyl esters having from 1 to 20 carbon atoms but not mentioned above, and the alkyl radical here can be linear, branched or cyclic. Furthermore, a23) can comprise aliphatic comonomers which are capable of free-radical polymerization and which are copolymerizable with the alkyl acrylates a21). However, the intention is to exclude significant proportions of aromatic comonomers, such as styrene, alpha-methylstyrene or vinyltoluene, since they lead to undesired properties of the molding composition—especially on weathering.

When the tough phase is produced in the first stage, careful attention has to be paid to the setting of the particle size and its polydispersity. The particle size of the tough phase here is in essence dependent on the concentration of the emulsifier. The particle size can advantageously be controlled via the use of a seed latex. Particles whose (weight-average) particle size is below 130 nm, preferably below 70 nm, and whose particle-size polydispersity $P_{80}$ is below 0.5 ($P_{80}$ being determined from cumulative evaluation of the particle-size distribution determined by ultracentrifuge; the relationship is: $P_{80}=[(r_{90}-r_{10})/r_{50}]-1$, where $r_{10}$, $r_{50}$, $r_{90}$=average cumulative particle radius, being the value which is greater than 10, 50, 90% of the particle radii and is smaller than 90, 50, 10% of the particle radii), preferably below 0.2, are achieved using emulsifier concentrations of from 0.15 to 1.0% by weight, based on the aqueous phase. This applies especially to anionic emulsifiers, examples being the particularly preferred alkoxylated and sulphated paraffins. Examples of polymerization initiators used are from 0.01% by weight to 0.5% by weight of alkali metal peroxodisulphate or ammonium peroxodisulphate, based on the aqueous phase, and the polymerization reaction is initiated at temperatures of from 20 to 100° C. Preference is given to use of redox systems, an example being a combination composed of from 0.01% by weight to 0.05% by weight of organic hydroperoxide and from 0.05 to 0.15% by weight of sodium hydroxymethylsulphinate, at temperatures of from 20 to 80° C.

The glass transition temperature of the hard phase a1) of which at 15% by weight has covalent bonding to the tough phase a2) is at least 70° C. and this phase can be composed exclusively of methyl methacrylate. Up to 20% by weight of one or more other ethylenically unsaturated monomers which are capable of free-radical polymerization can be present as comonomers a12) in the hard phase, and the amount of alkyl (meth)acrylates used here, preferably alkyl acrylates having from 1 to 4 carbon atoms, is such that the glass transition temperature is not below the glass transition temperature mentioned above.

The polymerization of the hard phase a1) proceeds likewise in emulsion in a second stage, using the conventional auxiliaries, for example those also used for polymerization of the tough phase a2).

The Stabilizer Package (Light Stabilizer)

Light stabilizers are well known and are described in detail by way of example in Hans Zweifel, Plastics Additives Handbook, Hanser Verlag, 5th edition, 2001, pp. 141 et seq. Light stabilizers are UV absorbers, UV stabilizers and free-radical scavengers.

UV absorbers can, for example, derive from the group of the substituted benzophenones, salicylic esters, cinnamic esters, oxalanilides, benzoxazinones, hydroxy-phenylbenzotriazoles, triazines or benzylidenemalonate. The best-known representatives of the UV stabilizer/free-radical scavengers are provided by the group of the sterically hindered amines (hindered amine light stabilizer, HALS).

The inventive stabilizer package is composed of the following components:
   component A: a UV absorber of benzotriazole type,
   component B: a UV absorber of triazine type
   component C: a UV stabilizer (HALS compound)

The individual components used can take the form of an individual substance or of mixtures.

Intrapolymerizable UV absorbers

Typical monomers of this type contain groups with high absorption in the wavelength range from 290 to 370 nm. Preference is given to monomers whose UV absorption in the form of a layer of thickness 5 mm of a solution in chloroform (spectroscopic quality) at a concentration of 0.002% by weight is at least 10%. Examples of suitable compounds are derivatives of 2-hydroxybenzophenone, of hydroxyacetophenone, of cyano-β,β-biphenyl, of hydroxybenzoic esters, of oxanilide, of para-aminobenzoic esters or of the 6,8-dialky-4-oxo-5-chromanyl group. The ethylenically unsaturated groups which are present in these monomers and which are capable of free-radical polymerization are preferably acrylic, methacrylic, allyl or vinyl groups.

Examples of suitable monomers are: 2-(cyano-β,β-biphenylacryloyloxy)ethyl-1 methacrylate, 2-(2'-hydroxy-3'-methacrylamidomethyl-5'-octylphenyl)benzo-triazole, 2-hydroxy-4-(2-hydroxy-3-methacryloyloxy)-propoxybenzophenone, 2-(alpha-cyano-β,β-biphenyl-acryloyloxy)ethyl-2-methacrylamide, 2-hydroxy-4-methacryloyloxybenzophenone, 2-hydroxy-4-acryloyloxy-ethyloxybenzophenone, N-(4-methacryloylphenyl)-N'-2-ethylphenyl)oxamide, vinyl 4-ethyl-alpha-cyano-β-phenylcinnamate, 2-(2-hydroxy-5-vinylphenyl)-2-benzotriazole.

The selected proportion of the UV-absorbing monomers in the polymethyl methacrylate can advantageously be selected to be sufficiently high that the foil layer absorbs at least 98% of the incident UV radiation whose wavelength is from 290 to 370 nm. The concentration required for this depends on the layer thickness and on the effectiveness of the monomer. It is generally from 0.1% by weight to 2% by weight, based on the weight of the monomers used for preparation of the polymethyl (meth)acrylates.

Intrapolymerizable UV absorbers have the disadvantage of not migrating. During the course of weathering, the upper layer exposed to UV light and weathering becomes increasingly depleted in UV absorber, but no unused UV absorber can diffuse to replace it because the molecule has been immobilized as a constituent of the polymer, and the layer is unprotected from the attacks of UV radiation and weathering.

In contrast, the use of non-intrapolymerized UV absorber permits consequent migration of the UV absorber to the surface. At the same time, however, it is desirable to avoid escape of the migratory UV absorber from the plastics molding during processing, e.g. by extrusion. Preference is therefore given here to the use of involatile light stabilizers. Volatility can be determined by way of the weight loss in TGA to DIN ISO 11358. Preference is given here to light stabilizers which, when this test is carried out on the pure substance with a heating rate of 20° C./min in air, exhibit a weight loss of 2% at a temperature above 240° C., preferably above 270° C. and particularly preferably greater than 300° C.

Component A: UV Absorber of Benzotriazole Type

Examples of UV absorbers of benzotriazole type that can be used are 2-(2-hydroxy-5-methylphenyl)benzotriazole, 2-[2-hydroxy-3,5-di(alpha,alpha-dimethylbenzyl)phenyl]-benzotriazole, 2-(2-hydroxy-3,5-di-tert-butyl-phenyl)benzotriazole, 2-(2-hydroxy-3,5-butyl-5-methyl-phenyl)-5-chlorobenzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)benzotriazole, phenol, 2,2'-methylenebis[6-2H-benzotriazol-2-yl)-4-(1,1,3,3-tetramethylbutyl)].

The amounts used of the UV absorbers of benzotriazole type are from 0.1% by weight to 10% by weight, preferably from 0.2% by weight to 6% by weight and very particularly preferably from 0.5% by weight to 4% by weight, based on the weight of the monomers used to prepare the polymethyl (meth)acrylates. It is also possible to use mixtures of different UV absorbers of benzotriazole type.

Component B: UV Absorber of Triazine Type

Triazines, such as 2-(4,6-diphenyl-1,3,5-triazin-2-yl)-5-hexyloxyphenol, can moreover be used as UV stabilizers in the mixture.

The amounts used of the triazines are from 0.0% by weight to 5% by weight, preferably from 0.2% by weight to 3% by weight and very particularly preferably from 0.5% by weight to 2% by weight, based on the weight of the monomers used to prepare the polymethyl methacrylates. It is also possible to use mixtures of different triazines.

Component C: UV Stabilizers

An example which may be mentioned here for free-radical scavengers/UV stabilizers is sterically hindered amines, known as HALS (Hindered Amine Light Stabilizer). They can be used to inhibit ageing phenomena in paints and plastics, especially in polyolefin plastics (Kunststoffe, 74 (1984) 10, pp. 620-623; Farbe+Lack, Volume 96, 9/1990, pp. 689-693). The tetramethylpiperidine group present in the HALS compounds is responsible for the stabilizing effect. This class of compound can have no substitution on the piperidine nitrogen or else substitution by alkyl or acyl groups on the piperidine nitrogen. The sterically hindered amines do not absorb in the UV region. They scavenge free radicals that have been formed, whereas the UV absorbers cannot do this. Examples of HALS compounds which have stabilizing effect and which can also be used in the form of mixtures are: bis(2,2,6,6-tetramethyl-4-piperidyl) sebacate, 8-acetyl-3-dodecyl-7,7,9,9-tetramethyl-1,3,8-triazaspiro(4,5)-decane-2,5-dione, bis(2,2,6,6-tetramethyl-4-piperidyl) succinate, poly(N-β-hydroxyethyl-2,2,6,6-tetramethyl-4-hydroxy-piperidine succinate) or bis(N-methyl-2,2,6,6-tetramethyl-4-piperidyl) sebacate.

The amounts used of the HALS compounds are from 0.0% by weight to 5% by weight, preferably from 0.1% by weight to 3% by weight and very particularly preferably from 0.2% by weight to 2% by weight, based on the weight of the monomers used to prepare the polymethyl methacrylates. It is also possible to use mixtures of different HALS compounds.

Other costabilizers that can be used moreover are the HALS compounds described above, disulphites, such as sodium disulphite, and sterically hindered phenols and phosphites.

Further Additives

Further additives which can be added to the plastics molding include for example matting agents, pigments, dyes, adhesion modifiers or else other polymers.

Production of Plastics Moldings

The single- or multilayer foil is produced by methods known per se, examples being extrusion through a slot die, as in flat-film extrusion, or blown-film extrusion, or solution casting. Multilayer plastics moldings can by way of example also be produced by coextrusion, lamination, by extrusion coating or by lamination coating.

The plastics molding may also be made multilayer, if appropriate.

EXAMPLES

Method for examples:

Example 1

A PMMA foil having a thickness of 56μm is used, composed of
a) 89.8% by weight of a polymer composed of a two-phase impact modifier according to EP 0 528 196 whose overall constitution is
59.9% by weight of MMA
37.1% by weight of butyl acrylate
0.36% by weight of ethyl acrylate
0.66% by weight of allyl methacrylate
1.95% by weight of 3-(2-benzotriazololyl) 2-hydroxy-5-tert-octylbenzyl methacrylate, an intrapolymerizable UV absorber
0.53% by weight of dodecyl mercaptan based on abovementioned monomers
b) 10% by weight of PLEXIGLAS® 7H, available from Röhm GmbH,
c) 0.2% by weight of Tinuvin 360 (UV absorber based on benzotriazole from Ciba SC)
and this mixture is extruded to give a foil by means of conventional methods.

The foil is then laminated to a decorative PVC foil (brown wood effect) and then applied to a plastics support and tested.

Method for further examples:

Example 2

Example 1, but without 1.95% by weight of 3-(2-benzotriazololyl) 2-hydroxy-5-tert-octybenzyl methacrylate in the polymer +2.3% by weight, based on the foil according to Example 1, of Tinuvin® 360. The amounts of monomer in Example 1 are to be adjusted accordingly.

Example 3

Example 1, but without 1.95% by weight of 3-(2-benzotriazololyl) 2-hydroxy-5-tert-octybenzyl methacrylate +2.3% by weight, based on the foil according to Example 1, of Tinuvin® 360+0.4% by weight of Chimassorb 119 (HALS from Ciba SC). The amounts of monomer in Example 1 are to be adjusted accordingly.

Example 4

Example 1, but without 1.95% by weight of 3-(2-benzotriazololyl) 2-hydroxy-5-tert-octybenzyl methacrylate +0.75% by weight of CGX UVA 006 (UV absorber from Ciba SC based on triazine), based on the foil according to Example 1+0.8% by weight of Tinuvin® 360. The amounts of monomer in Example 1 are to be adjusted accordingly.

Example 5

Example 1, but without 1.95% by weight of 3-(2-benzotriazololyl) 2-hydroxy-5-tert-octybenzyl methacrylate +0.75% by weight of CGX UVA 006, based on the foil according to Example 1+0.4% by weight of Chimassorb 119+ 0.8% by weight of Tinuvin® 360. The amounts of monomer in Example 1 are to be adjusted accordingly.

Example 6

Example 1, but without 1.95% by weight of 3-(2-benzotriazololyl) 2-hydroxy-5-tert-octybenzyl methacrylate +0.6% by weight of CGX UVA 006, based on the foil according to Example 1+0.4% by weight of Chimassorb 119+1.1% by weight of Tinuvin® 360. The amounts of monomer in Example 1 are to be adjusted accordingly.

Example 7

Commercially available foil, producer: Cova

Example 8

Foil analogous to that of Example 1, but the foil here is laminated to a red decorative PVC foil and then applied to a plastic support and tested.

Example 9

Foil analogous to that of Example 3, but the foil here is laminated to a red PVC decorative foil and then applied to a plastic support and tested.

Example 10

Foil analogous to that of Example 5, but the foil here is laminated to a red PVC decorative foil and then applied to a plastic support and tested.

The foils produced were subjected to Xenotest weathering to ISO 4892-2. The irradiation intensity was 180 Watt/m², wavelength from 300 to 400 nm.

Example 11

Foil analogous to that of Example 3, but the butyl acrylate content of the matrix-forming phase is 8% by weight.

Example 12

Like Example 11 except for the following difference: Total regulator content is 0.39% by weight of dodecyl mercaptan based on the monomers used.
Result:
Following 4000 h of weathering in an Alpha High Energy accelerated-weathering device from Atlas, the following results were determined with regard to protective action (e.g. color change) for the underlying substrate (decorative wood effect) by means of an optical evaluation of the samples by a group of experts: Example 12 exhibits significant advantages over Example 11. Both the examples exhibit slight cracking in the PMMA layer.

Example 13

Like Example 12 except for the following difference:
The butyl acrylate fraction in the matrix-forming phase is 12% by weight.
Following 4000 h of weathering in an Alpha High Energy accelerated-weathering device from Atlas, the following results were determined with regard to protective action (e.g. color change) for the underlying substrate (decorative wood effect) by means of an optical evaluation of the samples by a group of experts: Example 13 exhibits equivalent behavior to Example 12. Cracking in the PMMA layer does not occur in the case of Example 13.

| Example | Color change (visual assessment after 4000 h) | Mattness (visual assessment after 4000 h) | Color change (visual assessment after 5333 h) | Mattness (visual assessment after 5333 h) |
|---|---|---|---|---|
| 1: | − | − | −− | −− |
| 2: | ○ | ○ | − to −− | − |
| 3: | ○ | ++ | ○ | + |
| 4: | ○ | ++ | ○ | + |
| 5: | + | ++ | + | ++ |
| 6: | + | ++ | + | + to ++ |
| 7: | − | ○ | −− | −− |
| 8: | − | − | −− | −− |
| 9: | ○ | ++ | ○ | + |
| 10: | ++ | ++ | ++ | ++ |

++ = no alteration visible
+ = only very slight alteration visible
○ = only slight alteration visible
− = marked alteration visible
−− = very marked alteration

The invention claimed is:

1. A poly(meth)acrylate film, comprising:
   1a) an impact-modified transparent poly(meth)acrylate plastic and
   1b) a mixture comprising a UV stabilizer and a UV absorber,
   wherein the impact-modified transparent poly(meth)acrylate plastic comprises from greater than 30% to 60% by weight of a poly(meth)acrylate matrix and 70% to 40% by weight of elastomer particles.

2. The film of claim 1, wherein the elastomer particles have an average particle diameter from 10 to 150 nm.

3. The film of claim 1, wherein the elastomer particles are distributed in the poly(meth)acrylate matrix and have a core with a soft elastomer phase and a hard phase bonded thereto.

4. The film of claim 1, wherein the matrix is composed of from 80% by weight to 100% by weight of free-radical-polymerized methyl methacrylate units and from 0% by weight to 20% by weight of other comonomers capable of free-radical polymerization.

5. The film of claim 4, wherein the matrix is composed of from 90% by weight to 99.5% by weight of free-radical-polymerized methyl methacrylate units and from 0.5% by weight to 12% by weight of other comonomers capable of free-radical polymerization.

6. The film of claim 4, wherein the other comonomers capable of free-radical polymerization are $C_1$-$C_4$-alkyl (meth)acrylates.

7. The film of claim 6, wherein the $C_1$-$C_4$-alkyl (meth)acrylates are selected from the group consisting of methyl acrylate, ethyl acrylate and butyl acrylate.

8. The film of claim 1, wherein the average molar mass $M_W$(weight-average) of the matrix is from 80 000 g/mol to 200 000 g/mol.

9. The film of claim 1, wherein the average molar mass $M_W$(weight-average) of the matrix is from 100 000 g/mol to 180 000 g/mol.

10. The film of claim 1, wherein the matrix has an average molar mass $M_W$(weight-average) of from 108 000 g/mol to 180 000 g/mol.

11. The film of claim 1, wherein the poly(meth)acrylate matrix is composed of 85% by weight to 99.5% by weight of methyl methacrylate and from 0.5% by weight to 15% by weight of $C_1$- to $C_4$-alkyl (meth)acrylates.

12. The film of claim 1, wherein the poly(meth)acrylate matrix is composed of 90% by weight to 99.5% by weight of methyl methacrylate and from 0.5% by weight to 10% by weight of methyl acrylate.

13. The plastics film according to claim 1, wherein the mixture comprising a UV stabilizer and a UV absorber comprises:
- a UV absorber of benzotriazole type in an amount of from 0.1% by weight to 10% by weight,
- a UV absorber of triazine type in an amount of from 0.0% by weight to 5% by weight and
- a HALS compound in an amount of from 0.0% by weight to 5% by weight.

14. The plastics film according to claim 1, wherein the mixture comprising a UV stabilizer and a UV absorber comprises:
- a UV absorber of benzotriazole type in an amount of from 0.2% by weight to 6% by weight,
- a UV absorber of triazine type in an amount of from 0.2% by weight to 3% by weight and
- a HALS compound in an amount of from 0.1% by weight to 3% by weight.

15. The plastics film according to claim 1, wherein the mixture comprising a UV stabilizer and a UV absorber comprises:
- a UV absorber of benzotriazole type in an amount of from 0.5% by weight to 4% by weight,
- a UV absorber of triazine type in an amount of from 0.5% by weight to 3% by weight and
- a HALS compounds in an amount of from 0.2% by weight to 2% by weight.

16. A method of making the poly(meth)acrylate film of claim 1, comprising combining 1a) and 1b).

* * * * *